US009596693B2

(12) United States Patent
Truong et al.

(10) Patent No.: US 9,596,693 B2
(45) Date of Patent: *Mar. 14, 2017

(54) METHOD AND APPARATUS FOR MULTI-RADIO COEXISTENCE

(71) Applicant: Google Technology Holdings LLC, Mountain View, CA (US)

(72) Inventors: Phan Dao Minh Truong, Chicago, IL (US); Michael E. Russell, Lake Zurich, IL (US); Indranil S. Sen, Santa Clara, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 14/334,973

(22) Filed: Jul. 18, 2014

(65) Prior Publication Data

US 2014/0328331 A1  Nov. 6, 2014

Related U.S. Application Data

(63) Continuation of application No. 12/488,075, filed on Jun. 19, 2009, now Pat. No. 8,787,468.

(51) Int. Cl.
*H04J 3/00* (2006.01)
*H04W 4/00* (2009.01)
(Continued)

(52) U.S. Cl.
CPC ......... *H04W 72/082* (2013.01); *H04W 4/008* (2013.01); *H04W 72/1215* (2013.01); *H04W 88/06* (2013.01)

(58) Field of Classification Search
CPC .............. H04W 72/082; H04W 4/008; H04W 72/1215; H04W 88/06
See application file for complete search history.

(56) References Cited

U.S. PATENT DOCUMENTS 5,943,333 A 8/1999 Whinnett et al.
7,039,358 B1 5/2006 Shellhammer et al.
(Continued)

FOREIGN PATENT DOCUMENTS

CN  1893382 A  1/2007
EP  1119137 B1  8/2006
(Continued)

OTHER PUBLICATIONS

Decision on Rejection for Application No. CN 201080027191.0 dated Jul. 3, 2014.
(Continued)

*Primary Examiner* — Kiet Tang
(74) *Attorney, Agent, or Firm* — Lerner, David, Littenberg, Krumholz & Mentlik, LLP (57) ABSTRACT

A method for multi-radio coexistence receives historical frequency usage information and historical time usage information from a first radio. The method creates a time and frequency mask by extrapolating the historical frequency and time usage information to future times and frequencies when the first radio will be active and uses the time and frequency mask to schedule a second radio to avoid receiving when the first radio will likely be active. A related apparatus has a collocated radio input for receiving timing usage information, a non-collocated radio input for receiving frequency usage information, and a time and frequency mask generator for creating a time and frequency mask using the timing usage information and the frequency usage information. The method and apparatus predicts collocated and non-collocated radio activity in both the time and frequency dimensions to reduce interference among radios operating in overlapping or adjacent frequency bands.

20 Claims, 9 Drawing Sheets

(51) Int. Cl.
*H04W 72/00* (2009.01)
*H04W 72/08* (2009.01)
*H04W 72/12* (2009.01)
*H04W 88/06* (2009.01)

(56) References Cited

U.S. PATENT DOCUMENTS

| | | | |
|---|---|---|---|
| 7,046,649 | B2 | 5/2006 | Awater et al. |
| 7,095,754 | B2 | 8/2006 | Benveniste |
| 7,099,671 | B2 | 8/2006 | Liang |
| 7,545,787 | B2 | 6/2009 | Bitran et al. |
| 2002/0122405 | A1 | 9/2002 | Liang |
| 2002/0142779 | A1* | 10/2002 | Goto .................... H04W 72/02 455/450 |
| 2004/0242159 | A1 | 12/2004 | Calderon et al. |
| 2005/0215197 | A1 | 9/2005 | Chen et al. |
| 2005/0239474 | A9 | 10/2005 | Liang |
| 2005/0246754 | A1 | 11/2005 | Desai et al. |
| 2006/0246932 | A1 | 11/2006 | Liang |
| 2006/0252418 | A1 | 11/2006 | Quinn et al. |
| 2006/0274704 | A1* | 12/2006 | Desai ................ H04W 72/1215 370/338 |
| 2006/0292986 | A1 | 12/2006 | Bitran et al. |
| 2006/0292987 | A1 | 12/2006 | Ophir et al. |
| 2007/0066314 | A1 | 3/2007 | Sherman et al. |
| 2007/0099567 | A1 | 5/2007 | Chen et al. |
| 2007/0135162 | A1 | 6/2007 | Banerjea et al. |
| 2007/0153749 | A1 | 7/2007 | Waxman |
| 2007/0183352 | A1 | 8/2007 | Muhammad et al. |
| 2007/0183383 | A1 | 8/2007 | Bitran et al. |
| 2007/0184798 | A1 | 8/2007 | Bitran et al. |
| 2007/0184835 | A1 | 8/2007 | Bitran et al. |
| 2007/0232358 | A1 | 10/2007 | Sherman |
| 2007/0275746 | A1 | 11/2007 | Bitran |
| 2007/0281743 | A1 | 12/2007 | Palin et al. |
| 2008/0037458 | A1 | 2/2008 | Myszne |
| 2008/0051085 | A1 | 2/2008 | Ganton |
| 2008/0062919 | A1 | 3/2008 | Chen et al. |
| 2008/0080555 | A1 | 4/2008 | Carter et al. |
| 2008/0089261 | A1 | 4/2008 | Wentink |
| 2008/0139212 | A1 | 6/2008 | Chen et al. |
| 2008/0205365 | A1 | 8/2008 | Russell et al. |
| 2009/0147838 | A1 | 6/2009 | Shida et al. |
| 2010/0061326 | A1* | 3/2010 | Lee ....................... H04W 72/12 370/329 |

FOREIGN PATENT DOCUMENTS

| | | |
|---|---|---|
| EP | 1806872 A1 | 7/2007 |
| WO | 2006069352 A1 | 6/2006 |
| WO | 2007002688 A2 | 1/2007 |
| WO | 2008106302 A2 | 9/2008 |

OTHER PUBLICATIONS

International Preliminary Report on Patentability Chapter I for Application No. PCT/US2010/034650 dated Dec. 20, 2011.
Bluetooth SIG, "Specification of the Bluetooth System: Wireless Connections Made Easy", Core V2.1 + EDR, Jul. 26, 2007, vol. 0 pp. 1-30, vol. 1 pp. 26-30.
Michael E. Russell and Arnold Sheynman, "Method and Apparatus for Co-Existence of an OFDMA Transmitter with a Synchronous Frame-Based Transmitter," U.S. Appl. No. 12/367,500, filed Feb. 6, 2009.
Patent Cooperation Treaty, International Searching Report and Written Opinion of the International Searching Authority for International Patent Application No. PCT/US2010/034650 Jul. 30, 2010, 16 pages.

* cited by examiner

METHOD AND APPARATUS FOR MULTI-RADIO COEXISTENCE

CROSS-REFERENCE TO RELATED APPLICATION

The present application is a continuation of U.S. patent application Ser. No. 12/488,075, filed on Jun. 19, 2009, issued as U.S. Pat. No. 8,787,468 on Jul. 27, 2014, the disclosure of which is hereby incorporated herein by reference.

FIELD OF THE DISCLOSURE

This disclosure relates generally to improving coexistence among radios operating in overlapping or adjacent frequency bands. These radios may be collocated (i.e., within a single device) or non-collocated (i.e., not within a single device).

BACKGROUND OF THE DISCLOSURE

IEEE 802.15 wireless personal area network (WPAN) radios (sometimes referred to as Bluetooth® radios) provide low cost, low power, short range, ad-hoc connectivity among devices such as mobile phones, computers, and headsets. Bluetooth® technology uses frequency hopping spread spectrum technology and divides the 2.4 GHz Industrial, Scientific, and Medical (ISM) band into 791 MHz channels. The hop rate is 1600 hops per second, and time is divided into 625 microsecond slots. The basic Bluetooth® topology has a piconet with one master and up to seven slaves synchronized to the master's clock. Communications occurs only between a master and its slave. Time division duplexing is used for bi-directional communication, and a slave may transmit only when explicitly polled by its master.

Bluetooth® radios are often collocated with other wireless radios such as WiMAX, WiFi, UMTS, or LTE radios. In other words, Bluetooth® radios are often in a device with another radio. Examples include: a mobile phone with a UMTS radio and a Bluetooth® radio; and a laptop computer with a WiFi radio and a Bluetooth® radio. Additionally, Bluetooth® radios often operate in the vicinity of non-collocated radios such as other Bluetooth® radios and/or WiMAX, WiFi, UMTS, or LTE radios. Because these multiple radios can wirelessly interfere with each other, coexistence mechanisms should be developed for a variety of collocated and non-collocated scenarios.

Coexistence refers to the ability for multiple wireless protocols to operate in or around the same frequency band without significant degradation to any radio's operation. Without coexistence mechanisms, radio frequency interference can cause decreased data throughput and increased current drain.

In the ISM band at 2.4-2.5 GHz, Bluetooth® radios suffer and cause interference with other radios operating in the 2.4 GHz frequency band, such as other WPAN/Bluetooth® radios and IEEE 802.11b/g wireless local area network (WLAN) radios (sometimes referred to as WiFi radios). Next, Bluetooth® radios may also interfere with radios operating in the lower-adjacent Wireless Communication Service (WCS) band at 2.30-2.39 GHz, such as IEEE 802.16e wireless metropolitan area network (WMAN) radios (sometimes referred to as WiMAX or WiBro radios). Finally, Bluetooth radios can interfere with radios operating in the upper-adjacent Instructional Fixed Television Service (IFTS) and Multichannel Multipoint Distribution Services (MMDS) bands at 2.5-2.69 GHz frequency bands, which could be WiMAX radios or possibly LTE or WCDMA wireless wide area network (WWAN) radios.

With the continuing emergence of a variety of wireless communication technologies operating in frequencies overlapping or adjacent to the ISM frequency band, there is an opportunity to provide more effective solutions to mitigate interference and coexistence problems among collocated and non-collocated radios. The various aspects, features and advantages of the disclosure will become more fully apparent to those having ordinary skill in the art upon careful consideration of the following Drawings and accompanying Detailed Description.

DETAILED DESCRIPTION

A method and apparatus for multi-radio coexistence predicts radio activity in both the time dimension and the frequency dimension to reduce interference among radios operating in overlapping or adjacent frequency bands. The radio may be collocated or non-collocated. Available collocated radio information, such as frequency usage, MAC-level timing, and hardware interface information, plus available non-collocated radio information, such as over-the-air and carrier sense information, is used to predict future wireless resource usage in both time and frequency dimensions. These predictions, plus time-dimension-only information from a scheduler and frequency-dimension-only information from an adaptive frequency hopping sequence generator, are used by a time and frequency information aggregator to produce a time and frequency mask. The time and frequency mask indicates where (in both time and frequency) interference may be expected. A lower priority radio may use the time and frequency mask to schedule transmissions and receptions to avoid at least some of this expected interference.

Figure 1:
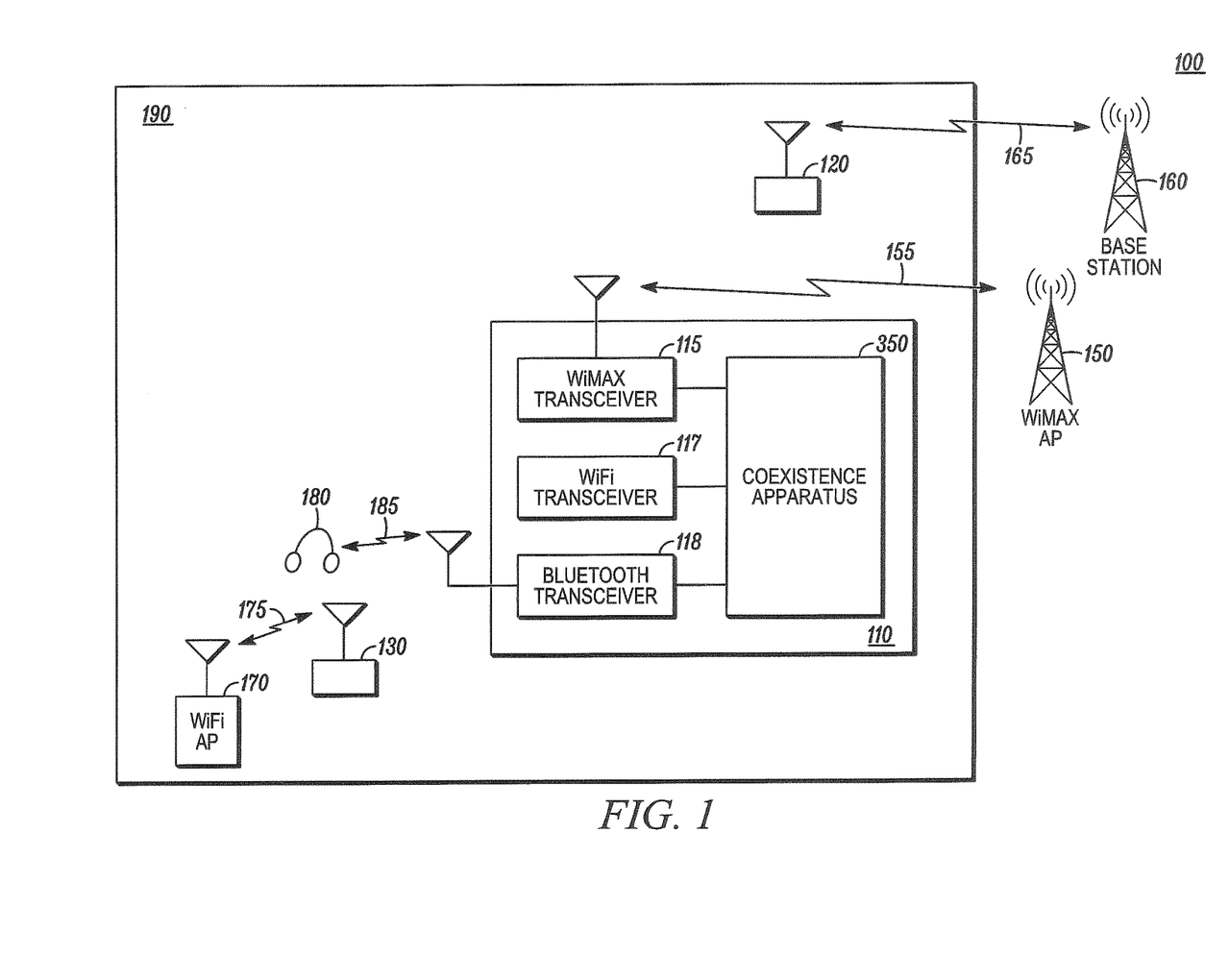
FIG. 1 shows an example of a system diagram having a device with collocated Bluetooth and WiMAX radios as well as two additional, non-collocated radios.

FIG. 1 shows an example of a system diagram 100 having a communication device 110 with collocated Bluetooth and WiMAX radios as well as two additional, non-collocated radios 120, 130. The communication device 110 with collocated Bluetooth and WiMAX radios may be used to conduct a Voice over Internet Protocol (VoIP) telephone conversation using a wireless Bluetooth headset 180. The WiMAX transceiver 115 is compliant with IEEE 802.16e standards and wirelessly communicates 155 at 2.5 GHz to a WiMAX access point 150. Note that the WiMAX transceiver 115 could be replaced with a UTRA-UTRAN Longer Term Evolution (LTE) transceiver, a Multiband OFDM Alliance (MBOA) ultra-wide band (UWB) transceiver, or any other broadband communication protocol transceiver operating in the same or adjacent band as a Bluetooth transceiver 118. In this example, the first device 110 also includes a WiFi transceiver 117, which is currently not active. The first device 110 has a coexistence apparatus 350 to reduce interference with both collocated and non-collocated radios, which will be explained in more detail in conjunction with FIG. 3 and FIG. 4.

The Bluetooth transceiver 118 is compliant with IEEE 802.15 standards and wirelessly communicates 185 at 2.4 GHz with the Bluetooth headset 180. Note that the Bluetooth headset 180 could be replaced with another Bluetooth device, such as a computer, media player, or media recorder.

Meanwhile, within the same room 190 or general area, a second device 120, such as a mobile phone, is wirelessly communicating 165 using a wireless broadband technology such as UMTS or LTE to a base station 160 using an adjacent or overlapping frequency band. Furthermore, a third device 130, such as a laptop with wireless connection, is wirelessly communicating 175 with an access point 170 using a WiFi connection in the ISM frequency band.

This scenario shows collocated radios within the first device 110 as well as two non-collocated radios 120, 130 that may interfere with one or both of the radios in the first device 110. Of course, other scenarios may be developed which add or replace the potentially interfering radios shown. Note also, that although interference in and around the ISM band is shown, interference may occur in and around other frequency bands depending on frequency spectrum allocations, and coexistence can be improved in other frequency bands using the techniques disclosed in this patent application.

Figure 2:
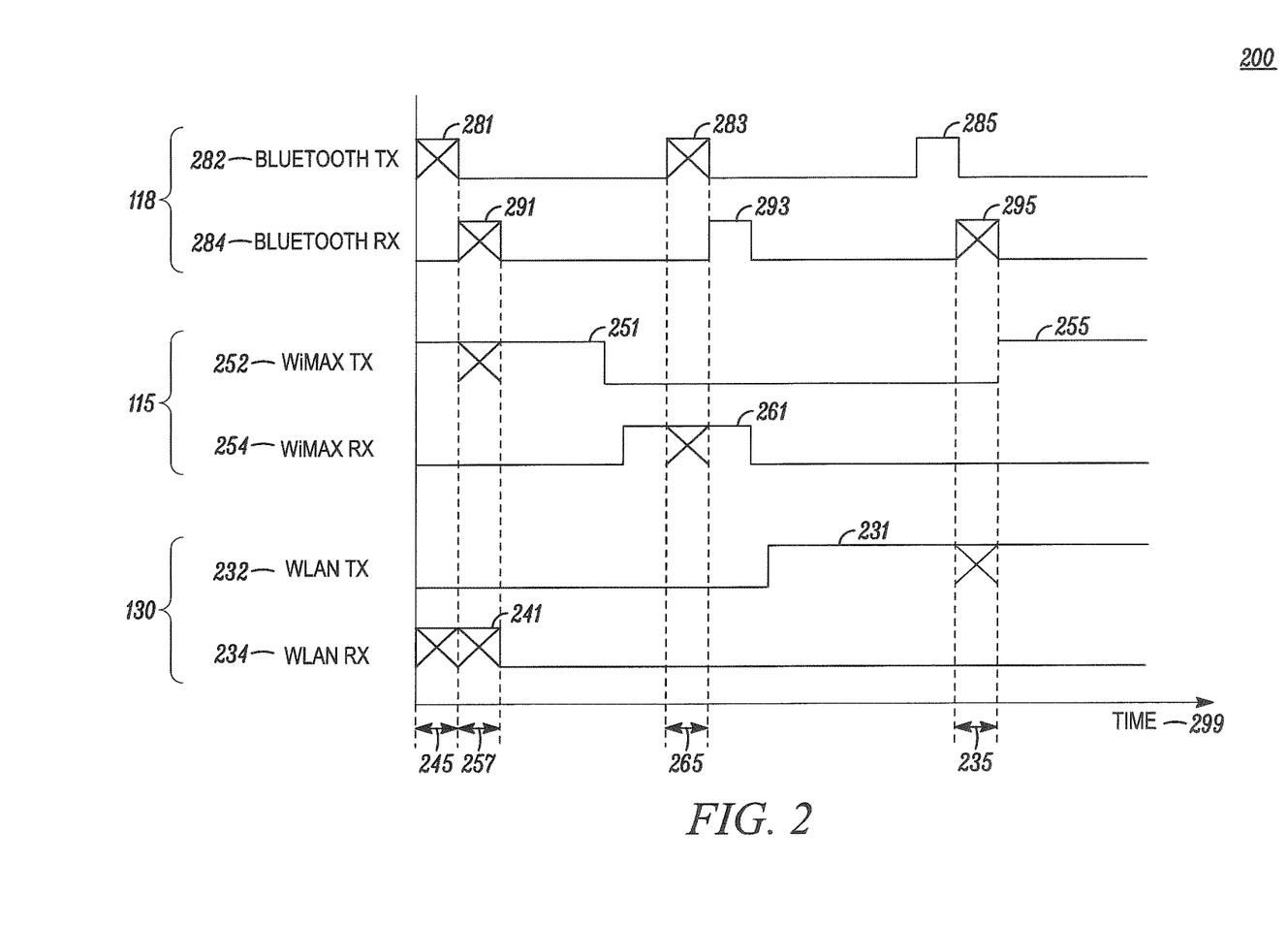
FIG. 2 shows an example of how different radios operating in shared or adjacent frequency bands may interfere by overlapping in the time domain.

FIG. 2 shows an example 200 of how different radios operating in shared or adjacent frequency bands may interfere by overlapping in the time domain. The x-axis 299 illustrates the passage of time. Taking a two-device 110, 130 subset of the example system diagram in FIG. 1, the Bluetooth transceiver 118 within the first device 110 has a Bluetooth transmitter 282 that is active on a periodic basis 281, 283, 285 using an extended synchronous connection oriented (eSCO) link. The Bluetooth receiver 284 is active on a periodic basis 291, 293, 295 in the Bluetooth timeslot immediately following the Bluetooth transmitter's activity, due to the requirements of Bluetooth's master-slave protocol. (Note that, in this scenario, the Bluetooth transceiver 118 is a master and thus the Bluetooth headset 180 shown in FIG. 1 must be a slave.)

Meanwhile, the WiMAX transceiver 115 of the first device 110 in FIG. 1 has a WiMAX transmitter 252 that is active during portions 251, 255 of two WiMAX frames and the WiMAX receiver 254 is active during a different portion 261 of the first WiMAX frame shown.

Concurrently, a WiFi transceiver in the third device 130 of FIG. 1 has a WiFi transmitter 232 that is active during a portion 231 of a WiFi frame and a WiFi receiver 234 that is active 241 during a different portion of the WiFi frame.

Because all six of these transmitters and receivers 232, 234, 252, 254, 282, 284 operate between 2.30 and 2.69 GHz, interference between a transmitter of one radio and a receiver of another radio may cause receiver de-sense and packet collisions. Interference does not depend on whether the radios are collocated or non-collocated. For example, a Bluetooth transmission 281 from the first device 110 may cause interference for the WiFi receiver at the third device 130 during the time period 245 within the portion of the time that the WiFi receiver 234 is active 241. As another example, a WiMAX transmission 251 (particularly at time period 257) may interfere with a Bluetooth reception 291 in a collocated radio and a portion of a WiFi reception 241 in a non-collocated radio. Conversely, a Bluetooth transmission 283 may cause interference with the collocated WiMAX receiver 254 during a time period 265. As a final example, a WiFi transmission in a non-collocated radio may interfere with the Bluetooth reception as shown in time period 235. These numerous examples of interference between collocated radios as well as between non-collocated radios result in decreased throughput and increased power drain.

By suspending or delaying a lowest priority radio's transmissions during time periods that are predicted to be interfering, coexistence may be promoted. But a complete suspension or delay assumes that the interference affects the entire frequency band used by the lowest priority radio, which is not true in many circumstances. For example, if the WiMAX radio is using frequency division duplex (FDD), then it is probable that only one link (either the uplink or the downlink) will affect coexistence with Bluetooth. A coexistence apparatus in accordance with an embodiment helps to reduce interference caused by both collocated and non-collocated radios. The coexistence predictor determines repeating transmission and reception patterns in both time and frequency to create a time and frequency mask. The time and frequency mask is used to schedule transmissions in both time and frequency for a particular protocol (e.g., Bluetooth) to reduce radio frequency interference yet allow more transmission opportunities than only scheduling with respect to time.

Figure 3:
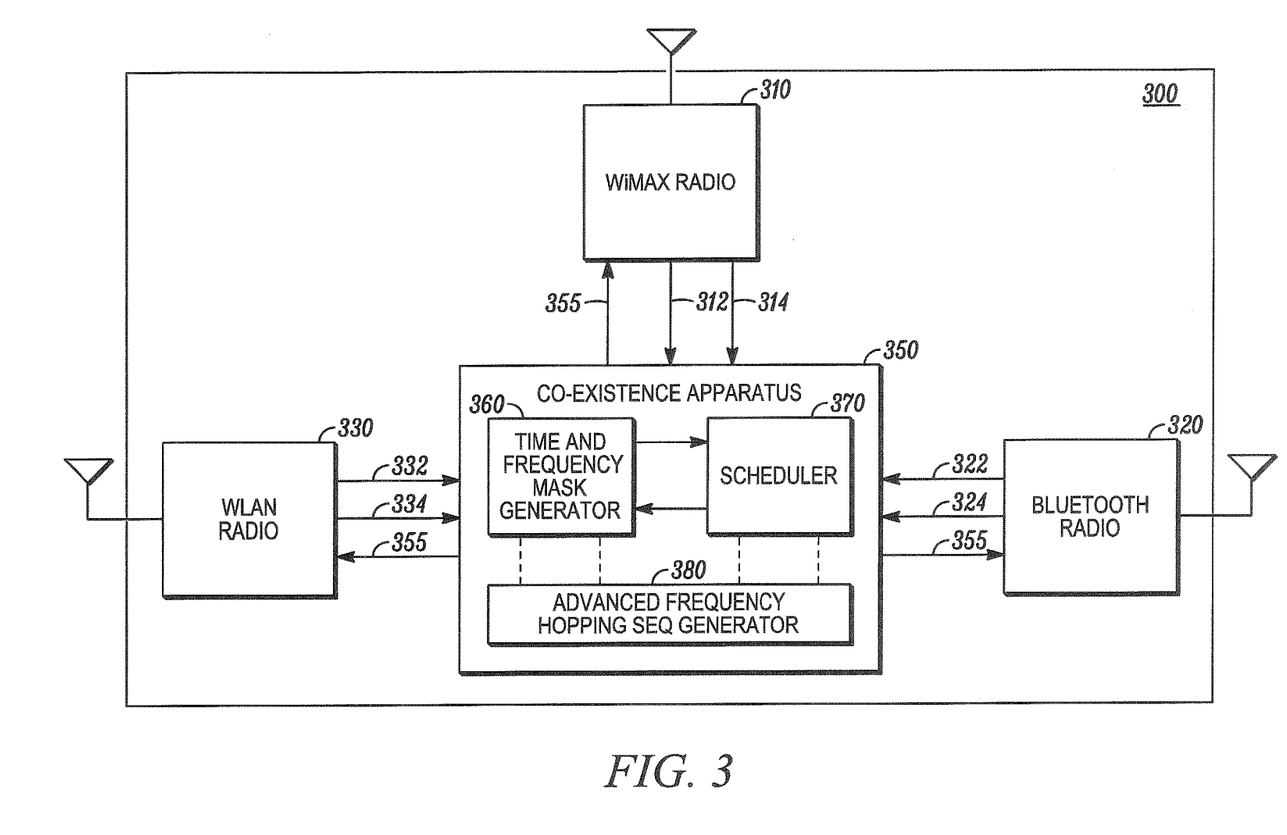
FIG. 3 shows a block diagram of a mobile device with a coexistence predictor in accordance with an embodiment.

FIG. 3 shows a block diagram of a mobile device 300 with a coexistence apparatus 350 in accordance with an embodiment In the embodiments shown here, Bluetooth will be assumed to be the lowest priority protocol, and thus Bluetooth scheduling will be most affected by the coexistence apparatus 350. In alternate embodiments, another technology may be set as the lowest priority. Note that, for the sake of clarity, user interface components and baseband portions of the mobile device are not shown.

The mobile device 300 is shown implemented as the first communication device 110 in FIG. 1. The mobile device 300 includes a WiMAX radio 310 (which could alternately or additionally be an LTE, WCDMA, or other WWAN/WMAN radio), a Bluetooth radio 320 (which could alternately be another type of WPAN radio), and a WiFi radio 330 (which could alternately be another type of WLAN radio). Each of these three radios has two conceptual connections to a coexistence apparatus 350; the actual number of connections depends on hardware implementation. One of the connections 312, 322, 332 from the radios carries instantaneous (or near-instantaneous) collocated-radio usage information and the other of the connections 314, 324, 334 carries instantaneous (or near-instantaneous) non-collocated-radio usage information.

The coexistence apparatus 350 collects and analyses the collocated-radio usage information from connections 312, 322, 332 and the non-collocated-radio usage information from connections 314, 324, 334 to create historical time and frequency usage information and uses extrapolation to predict future usage patterns with respect to both time and frequency. Note that, instead of using dedicated input pins (e.g., GPIO) or a bus as shown here, information can alternately be transferred using a common memory. Again, the actual number of pins, bus lines, etc. is implementation dependent.

Within the coexistence apparatus 350, a scheduler 370 determines timing usage information from collocated radios via input connections 312, 322, 332 on a per-radio basis, and an advanced frequency hopping (AFH) sequence generator 380 determines available frequency usage information from non-collocated radios via input connections 314, 324, 334.

A time and frequency mask generator 360 within the coexistence apparatus 350 collects the instantaneous usage patterns from all the input connections 312, 314, 322, 324, 332, 334, the timing-only information from the scheduler 370, and the frequency-only information from the AFH sequence generator 380. The mask generator 360 uses historical and current usage pattern information to predict future usage patterns which are then used to create a time and frequency mask 355. When one or more of the radios is performing scanning or data transmission, the lowest priority radio uses the time and frequency mask 355 when scheduling future scans or data transmissions to reduce interference with collocated and/or non-collocated technologies. For example, when Bluetooth is the lowest priority radio, the Bluetooth AFH map (not shown) and the Bluetooth scheduler (not shown) within the Bluetooth radio 320 are altered using the time and frequency mask 355 to avoid certain Bluetooth frequency channels at certain times to reduce interference with collocated and non-collocated transmissions.

Unlike coexistence mechanisms that depend only on time division, the time and frequency mask allows simultaneous transmission/receptions in situations when not all frequency channels are affected by interference. Unlike coexistence mechanisms that depend only on frequency division, the time and frequency mask allows time-sharing of the wireless medium in situations where all frequency channels are affected by interference.

With respect to Bluetooth in particular, a time and frequency mask enables the Bluetooth slave device to sleep during intervals when it knows the master will not transmit. Currently, a Bluetooth slave must constantly be active (unless it is in the so-called "sniff" mode) because it does not know when the master will poll it. With information from a time and frequency mask, the Bluetooth slave is aware of time slots where the Bluetooth master will not transmit due to potential interference (either on the master-to-slave slot or the immediately-following slave-to-master slot) and thus the Bluetooth slave can enter a reduced power mode during those intervals. Also, a time and frequency mask is applicable to either a Bluetooth master or a Bluetooth slave, which is different from schemes that require the mobile device to be the master. Thus, the coexistence apparatus 350 gives a mobile device 300 more freedom to optimize its network topology.

Figure 4:
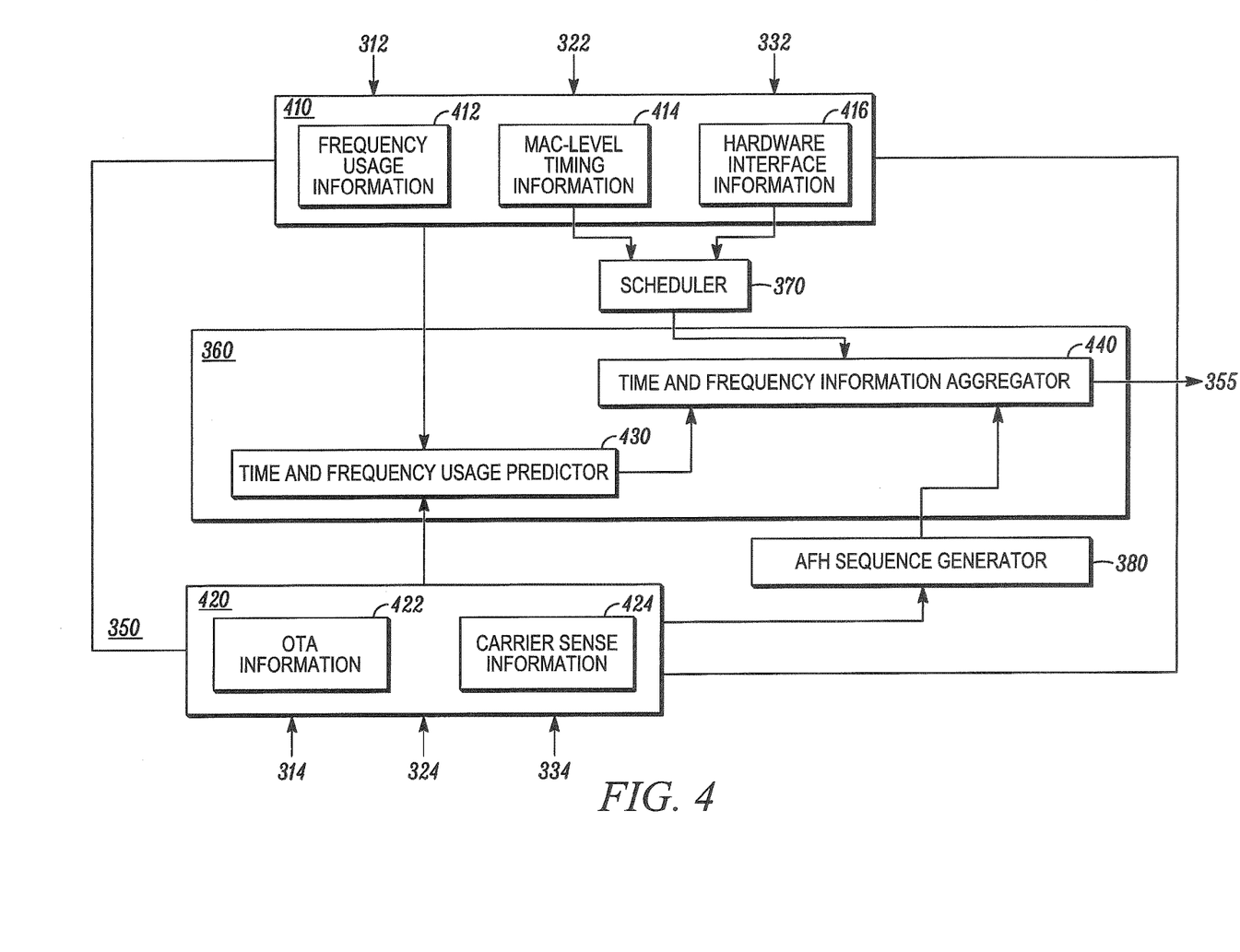
FIG. 4 shows a block diagram of details of a coexistence apparatus in accordance with an embodiment.

FIG. 4 shows a block diagram 400 of details of a coexistence apparatus 350 in accordance with an embodiment. As mentioned previously, the coexistence apparatus 350 collects instantaneous usage patterns and uses historical and current usage pattern information to predict future usage patterns which are then used to create a time and frequency mask 355. The coexistence apparatus 350 includes an input block 410 for receiving collocated-radio usage information, an input block 420 for receiving non-collocated-radio usage information, and a mask generator 360 for analyzing the radio usage information from the input blocks 410, 420 and creating a time and frequency mask based on predictions of future radio usage.

The input block 410 for collocated-radio usage information receives data from all active collocated radios within the same device as the coexistence apparatus 350, such as through connections 312, 322, 332 shown in FIG. 3. The usage information can generally be classified into frequency usage information 412, medium access control (MAC)-level timing information 414, and hardware interface information 416 from each active radio. Frequency usage information 412 can include: (1) an AFH channel map with a particular hopping sequence and (2) an AFH switch instant, which tells the slave the time instant when the master will switch to the new hopping sequence. MAC-level timing information 414 allows the radios to share high-granularity timing and frequency usage information about their current and future activity cycles. Hardware interface information 416 allows the radios to exchange signals when one of them is active (or inactive) and also provide priority information for a given transmission burst.

A scheduler 370 in the coexistence apparatus 350 can take time usage information from the collocated radios, namely MAC-level timing information 414 and hardware interface information 416 for each radio, and produce a time-dimensioned schedule for each radio.

The input block 420 for non-collocated-radio usage information receives wirelessly-collected data from proximate non-collocated radios, such as through connections 312, 322, 332 shown in FIG. 3. This usage information can generally be classified into over-the-air (OTA) information 422 and carrier sense information 424. OTA information 422 is simply time and frequency usage information of non-collocated radios that is sent to the first communication device 110 over the air. Carrier sense information 424 is collected through a radio of the first communication device 110 physically sensing the air interface medium and gathering activity history.

An advanced frequency hopping (AFH) sequence generator in the coexistence apparatus 350 can take the frequency usage information from the non-collocated radios and produce a frequency-dimensioned map indicating frequency bands where non-collocated radios are active and thus a source of potential interference.

The mask generator 360 receives the information collected regarding the time and frequency usage of the various collocated and non-collocated radios in the ISM band and adjacent frequency bands, including the scheduler 370 information and the AFH sequence generator 380 information. Within the mask generator 360, the time and frequency usage predictor 430 looks for periodic patterns within historical usage information as collected by the input block 420 for non-collocated radio usage information. When historical patterns are found in time and frequency, the time and frequency usage predictor 430 extrapolates the historical patterns to future patterns.

The time and frequency information aggregator 440 masks off time and frequencies in the future where at least one interferer is predicted. Thus, while the scheduler 370 masks out all frequencies at times when interference is predicted, and while the AFH sequence generator 380 masks out all times at frequencies where interference is predicted, the time and frequency mask generator 360 can mask out only certain frequencies (not all frequencies) at certain times (not all times) when interference is predicted.

Figure 5:
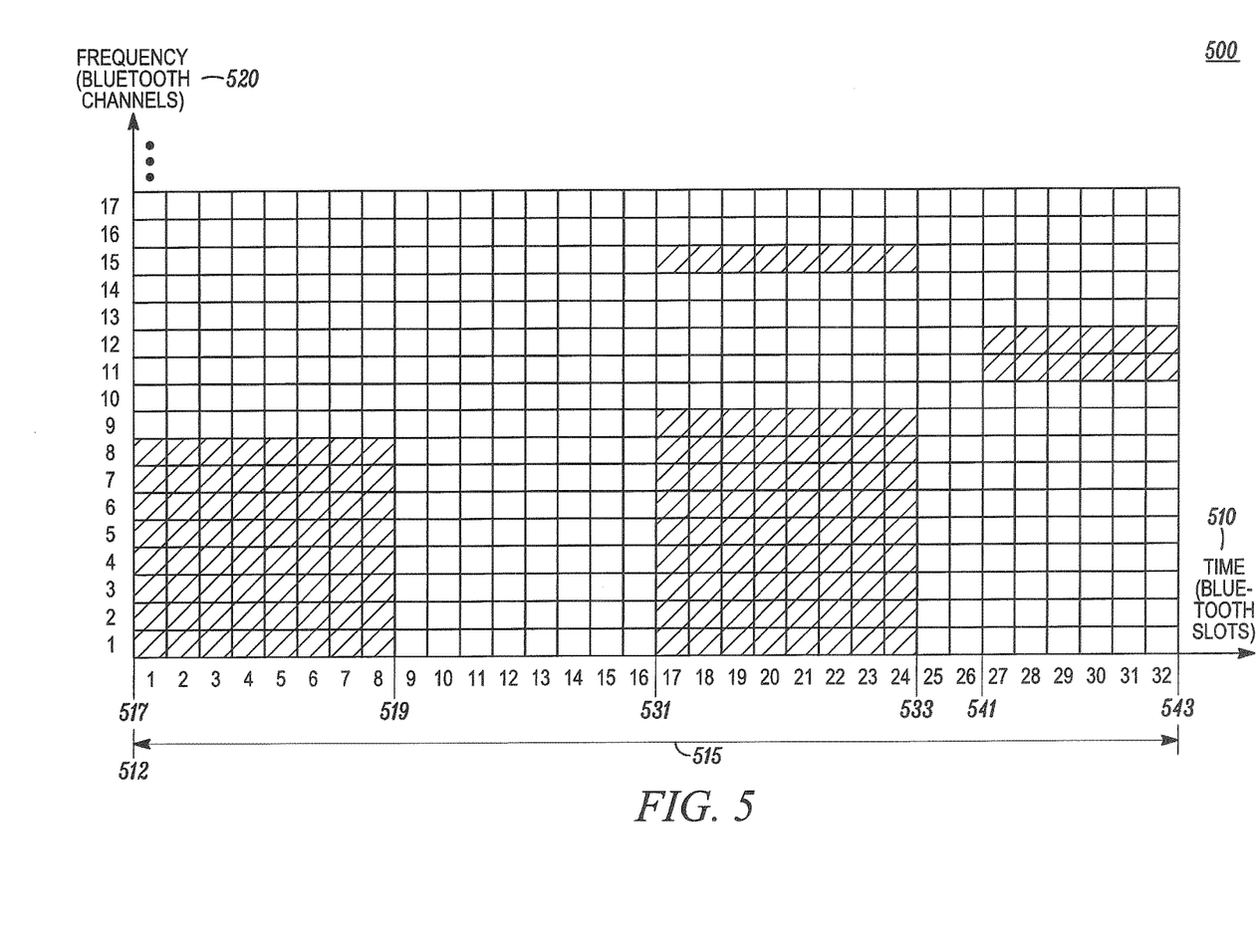
FIG. 5 shows an example of a time and frequency mask created within a coexistence apparatus such as the one shown in FIG. 4.

Continuing the assumption that the Bluetooth transceiver has the lowest priority, the time and frequency information aggregator 440 uses the collocated-radio time information from the scheduler 370 and the future time and frequency extrapolations of collocated and non-collocated radios from time and frequency usage predictor 430 to determine, for each Bluetooth frequency channel if possible, a periodic pattern of Bluetooth time intervals when the Bluetooth radio should not transmit or receive (i.e., Bluetooth transmission or reception during these Bluetooth time intervals on that Bluetooth channel would result in a collision). The periodic pattern of Bluetooth time intervals for each Bluetooth frequency channel can be represented by a time and frequency mask 355 indicating, for each Bluetooth frequency channel, Bluetooth time slots where the Bluetooth device shall be inactive due to interference. This time and frequency mask 355 would be sent to the Bluetooth radio, so that the Bluetooth radio's scheduler and AFH map can be adjusted in light of the mask FIG. 5 shows an example of a simplified time and frequency mask 500 created by a time and frequency mask generator 360 such as the one shown in FIG. 3 and FIG. 4. Because, in this series of examples, Bluetooth is the lowest priority technology for the communication device 110 (shown in FIG. 1), the time and frequency intervals of the mask 500 are based on Bluetooth technology. If another technology were the lowest priority technology, the mask would use that other technology's time and frequency intervals.

The x-axis 510 illustrates a time dimension and the y-axis 520 illustrates a frequency dimension. The time dimension is divided into Bluetooth slots (the smallest Bluetooth time interval, equivalent to 625 microseconds). The frequency dimension is divided into Bluetooth channels (the smallest Bluetooth frequency interval, equivalent to 1 MHz). In this example the mask is thirty-two Bluetooth slots in duration 515. Based on extrapolated time and frequency usage information from collocated and non-collocated radios, the time and frequency mask 500 shows sixteen Bluetooth slots blocked in the first 8 Bluetooth channels, eight Bluetooth slots blocked in the ninth Bluetooth channel, no slots blocked in the tenth channel, six slots blocked in channels 11 and 12, no slots blocked in channels 13 and 14, and eight slots blocked in channel 15. The mask 500 continues for each Bluetooth frequency channel.

Note that there is periodic interference on the first eight or nine Bluetooth channels. This scenario might occur if collocated or non-collocated frequency division duplex (FDD) WiBro transmissions (near 2.39 GHz) leaked into the lower portion of the ISM band (at 2.40 GHz). Similarly, if a collocated or non-collocated FDD LTE uplink was active at 2.50 GHz, it may interfere periodically with only the top dozen Bluetooth channels in the ISM band. The other interference (e.g., with Bluetooth channels 11, 12, and 15) may be caused by non-collocated Bluetooth radios or other technologies.

The time period 515 represented in a mask 500 may vary depending on the time periodicity of any usage patterns in the collocated and non-collocated radios. The frequency band represented in a mask 500 may vary depending on the operating channels of the lowest priority technology.

Although graphically shown in FIG. 5, the time and frequency mask 500 can be implemented in many ways. For example, the mask could contain: a start time 512, the length of the repeating time period 515 considered, and the start and end times of each masked interval for each Bluetooth frequency channel within that repeating time period 515. Another implementation would be to specify the start and end times of the masked intervals 517, 519, 531, 533, 541, 543 and associate to each interval the list of channels that are masked. The time and frequency mask 500 should be updated periodically based on information regarding collocated and non-collocated time and frequency usage of the wireless resources.

Continuing the assumption that Bluetooth is the lowest priority radio access technology, the time and frequency mask 500 should be shared with other Bluetooth radios in the WPAN, so that all the devices can adjust their frequency hopping sequence. Among Bluetooth devices involved in a piconet, a specific Link Manager Protocol (LMP) message can be used to exchange precise timing information regarding when a Bluetooth radio may or may not be active.

In a sub-case when only time information is used (i.e., time slots are either available on all channels or not available on any channel), the time and frequency mask 500 reduces to a time-only mask, and the Bluetooth devices involved in a Bluetooth WPAN may not need to share the time-only mask.

If no mechanism exists to share the time and frequency masks 500 among the Bluetooth piconet, the Bluetooth master schedules traffic assuming the Bluetooth slave(s) to be always present on the link. In this case, a slave does not need the mask 500 to experience improved data throughput, but the slave's power consumption will not improve because the Bluetooth slave's receiver is on all the time.

Figure 6:
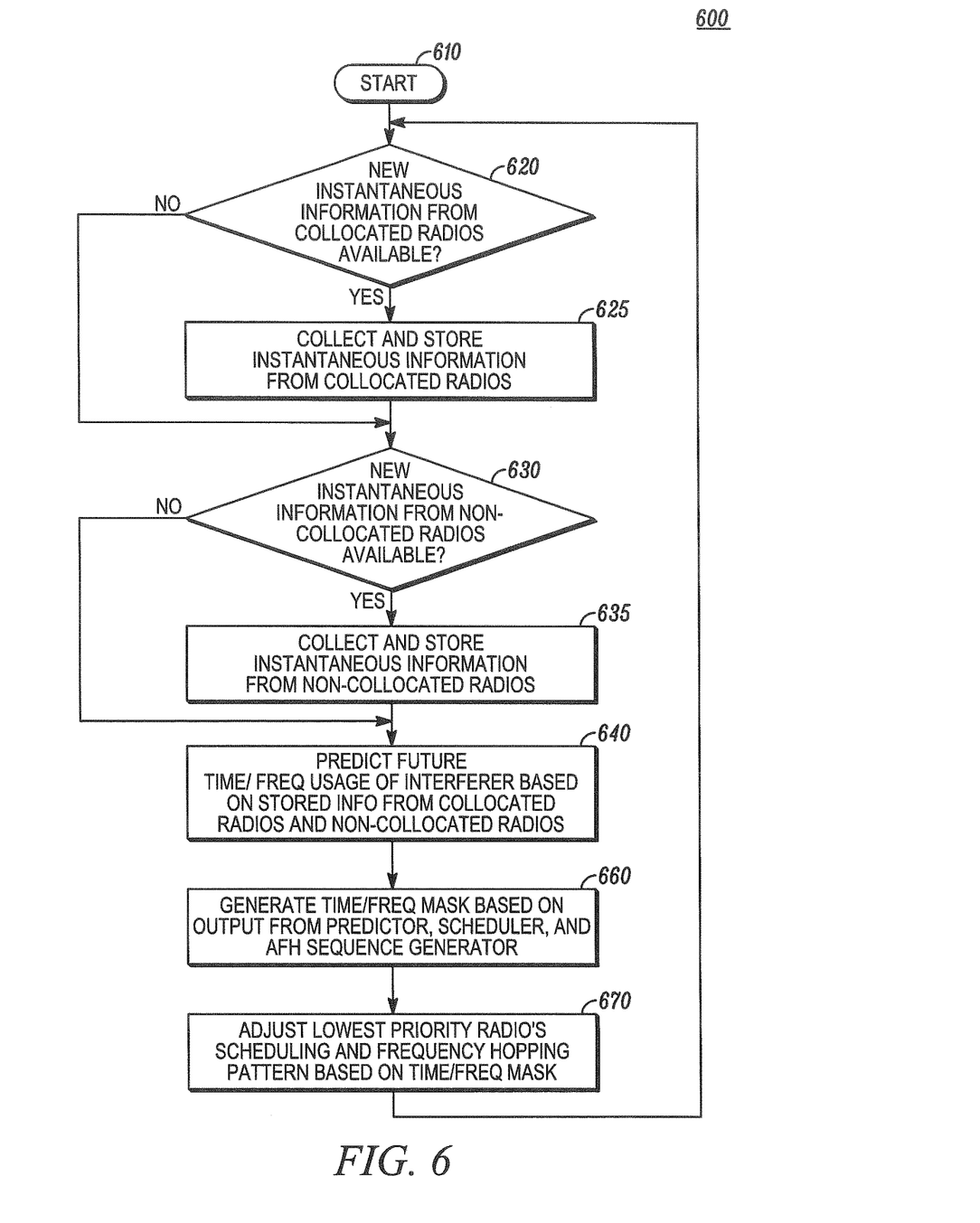
FIG. 6 is a flow diagram of a method for generating and using a time and frequency mask.

FIG. 6 is a flow diagram 600 of a method for generating and using a time and frequency mask. The time and frequency mask can be used both during data transmission (to reduce collisions) and during frequency scanning (to create an AFH map).

After start step 610, the coexistence apparatus 350 (shown in FIGS. 3 and 4) checks in step 620 if new instantaneous (or near-instantaneous) information is available from collocated radios. Note that a communication device with an active Bluetooth radio can obtain Bluetooth local channel classification information, which is a type of frequency usage information 412, at this step. In fact, input block 410 (shown in FIG. 4) is designed for this purpose. If new collocated radio information is available, step 625 collects and stores the instantaneous information from the collocated radios.

After step 625, or if no new instantaneous information from collocated radios is found, step 630 checks if new instantaneous information from non-collocated radios is found. Input block 420 is designed for this purpose. Note that a communication device with a Bluetooth master can query its Bluetooth slaves during this step for channel classification information, which is a form of OTA information 422. Also the collocated radios may be instructed during this step to scan their respective frequency bands (or a portion of the bands) to obtain carrier sense information 424. If new information is found, step 635 collects and stores this instantaneous information from non-collocated radios.

After step 635, or if no new instantaneous information from non-collocated radios is found, step 640 predicts future time and frequency usage of higher priority technologies (e.g., higher than Bluetooth in the scenarios shown) based on stored historical information from collocated and non-collocated radios. Time and frequency usage predictor 430 is designed for this purpose.

Note that the flow diagram represents a specific implementation, and steps 620 and 625 may occur after steps 630 and 635 in other implementations. Alternately, the various types of information 412, 414, 416, 422, 424 can be updated in a different sequence. As another variation, the input connections 312, 314, 322, 324, 332, 334 can be polled in a different sequence. Also, not every input needs to be polled at the same frequency. For example, non-collocated information (steps 630, 635) could be updated less frequently than collocated information (steps 620, 625).

In step 660, the time and frequency information aggregator 440 creates a time and frequency mask 355 based on the predicted future time and frequency usage of higher priority technologies using information from the time and frequency usage predictor 430 plus any information available from the scheduler 370 and the AFH sequence generator 380. The mask may be normalized to the time and frequency units of the lowest priority radio (e.g., see FIG. 5), or it may be generated and stored in more specific time and frequency units.

In step 670, the lowest priority radio receives the time and frequency mask and adjusts its scheduling timing and transmission frequencies based on the time and frequency mask. The adjustment may be captured in an adjusted AFH map, which can be sent from the Bluetooth master to the Bluetooth slaves during this step. (Conversely, if the communication device is the Bluetooth slave, an adjusted AFH map may be received from the Bluetooth master during this step.) The adjustments allow the lowest priority radio to reduce interference with collocated and non-collocated radios using both the time and frequency dimensions. Subsequently, the flow returns to step 620 to re-evaluate the collocated and non-collocated radio inputs and update the time and frequency mask as needed.

In this implementation, a time and frequency mask 355 has a specified duration (see time period 515 in FIG. 5), and the next time and frequency mask generated in step 660 occurs prior to the expiration of the duration of the previous time and frequency mask. Alternately, the Bluetooth radios may continue to use the adjusted AFH until a new adjusted AFH is received. Or the Bluetooth radios may revert to an unadjusted AFH map after the duration expires.

Figure 7:
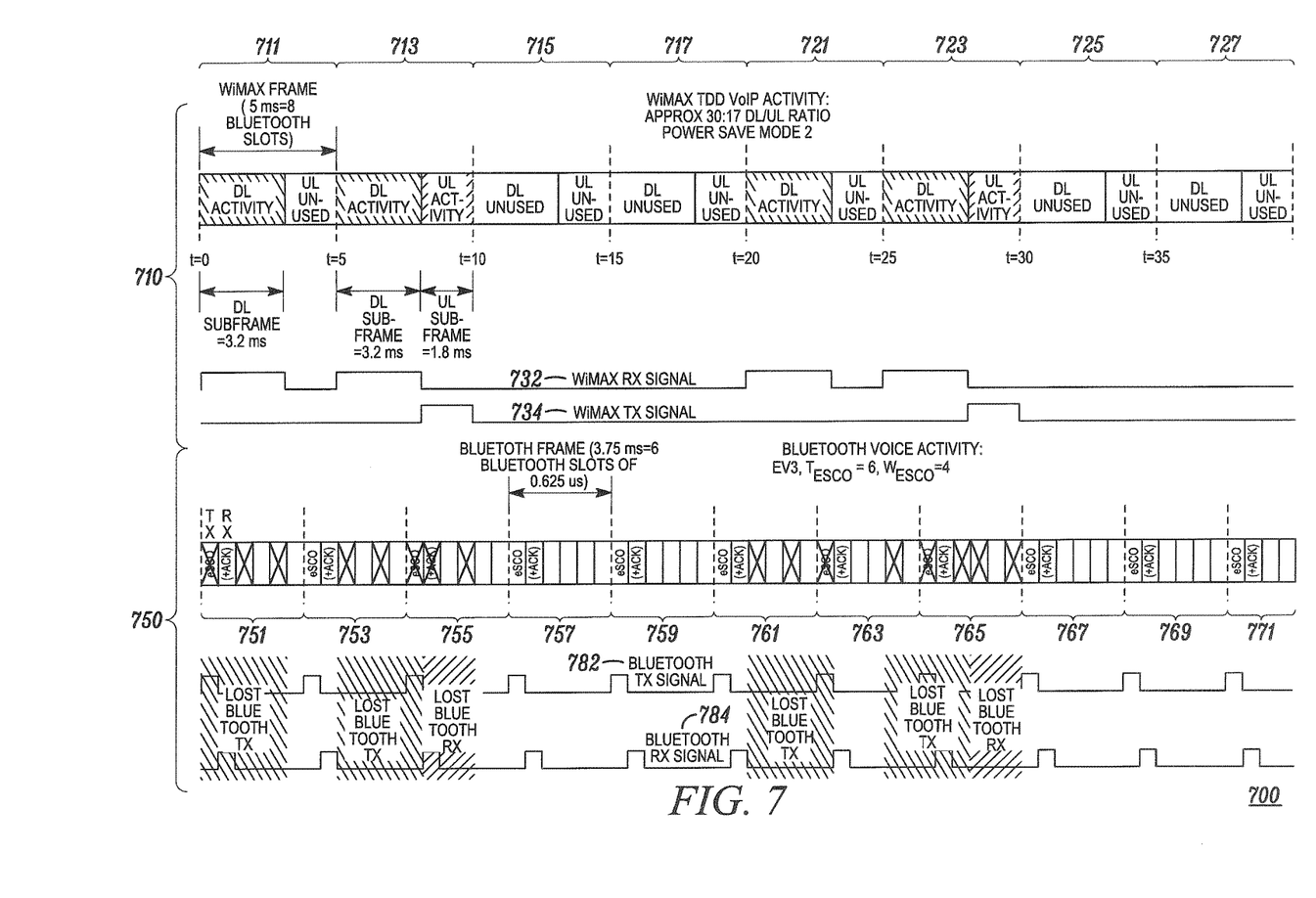
FIG. 7 is an example timing diagram showing a WiMAX Voice over Internet Protocol (VoIP) data transmission interfering with a Bluetooth extended synchronous connection oriented (eSCO) data transmission.

FIG. 7 is an example timing diagram 700 showing WiMAX Voice over Internet Protocol (VoIP) traffic 710 interfering with collocated Bluetooth extended synchronous connection oriented (eSCO) traffic 750. This example shows a WiMAX downlink/uplink ratio of 30:17 utilizing power save mode 2, which listens to downlink activity for two subframes 711, 713, transmits uplink data during the second subframe 713, and sleeps for two subframes 715, 717. This four WiMAX subframe pattern repeats in subframes 721, 723, 725, 727 and seems to be a typical usage pattern for WiMAX VoIP. FIG. 700 also shows the individual WiMAX receiver signal 732 and WiMAX transmitter signal 734.

If this WiMAX usage pattern is active along with a Bluetooth hands free link (see FIG. 1), then the Bluetooth transmitter may interfere with the WiMAX downlink. Also, Bluetooth received signals may be lost to the WiMAX uplink. In this example, each Bluetooth frame 751, 753, 755, 757, 759, 761, 763, 765, 767, 769, 771 is 3.75 milliseconds long and has six Bluetooth slots of 625 microseconds (i.e., $T_{esco}=6$). The Bluetooth packet type is EV3, and there are four retransmission opportunities (i.e., $W_{esco}=4$).

The first slot in each frame is transmitted by the Bluetooth master and the second slot in each frame is an acknowledgement transmitted by the Bluetooth slave. The other four slots in each frame are the retransmission opportunities. As shown in this example, the Bluetooth radio is a master; however, this is not a requirement for the coexistence apparatus.

As seen in FIG. 7, four of the eleven Bluetooth voice pairs (in frames 751, 755, 763, and 765) are lost due to WiMAX interference. More specifically, the Bluetooth master's transmission signal 782 in the first Bluetooth frame 751 causes interference with WiMAX reception during the first WiMAX subframe 711. The WiMAX transmission during the second WiMAX subframe 713 causes interference with Bluetooth reception 784 during the third Bluetooth frame 755. The Bluetooth transmission during the seventh Bluetooth frame 763 causes interference with the WiMAX reception during the fifth WiMAX subframe 721. And the Bluetooth transmission in Bluetooth frame 765 causes interference with the WiMAX reception during WiMAX subframe 723.

Simulations have shown that the Mean Opinion Score—Listening Quality Objective (MOS-LQO) score during this type of scenario is less than 3.0 more than 90% of the time. Note that a MOS of 3.8 typically marks the boundary between 'good' and 'bad' voice quality, and scores below 3.0 are typically deemed as unacceptably poor for telephony purposes. Note also that, after a Bluetooth packet is lost (in frames 751, 755, 763, and 765) many Bluetooth retransmission opportunities (denoted by the Xs in the other four Bluetooth slots within the same frame) are also affected by interference.

The coexistence apparatus 350 shown in FIG. 3 would reschedule Bluetooth transmissions and receptions to occur during periods of WiMAX inactivity. This saves power, enables the Bluetooth channel redundancy mechanisms (e.g., retransmissions) to be used for channel radio frequency interference rather than collocated interference, better utilizes bandwidth, and adds less radio frequency noise to the channel.

Figure 8:
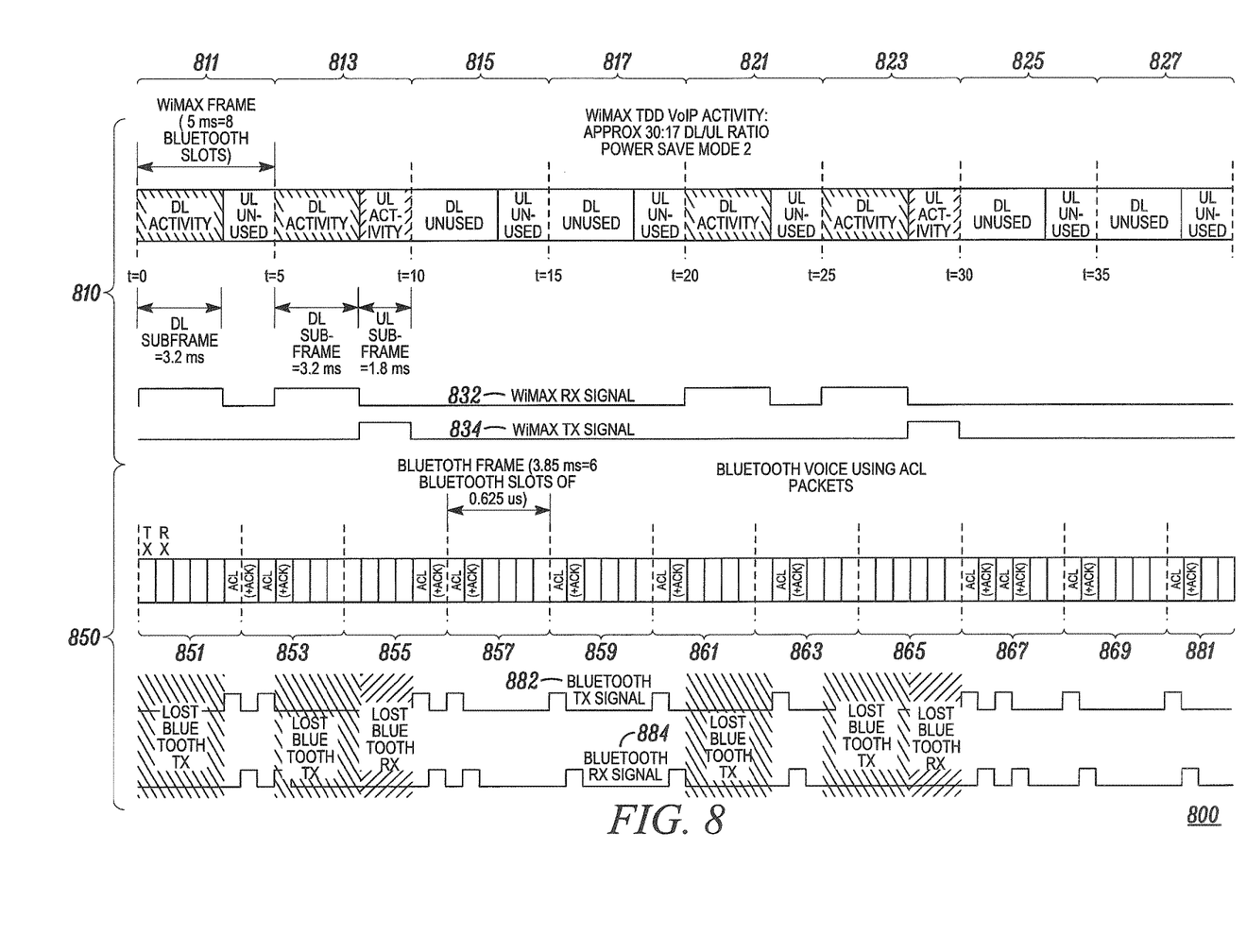
FIG. 8 is an example timing diagram demonstrating reduced interference between a WiMAX Voice over Internet Protocol (VoIP) data transmission and a Bluetooth asynchronous connectionless link (ACL) data transmission in accordance with an embodiment.

FIG. 8 is an example timing diagram 800 demonstrating reduced interference between WiMAX Voice over Internet Protocol (VoIP) traffic 810 and collocated Bluetooth asynchronous connectionless link (ACL) traffic 850 in accordance with an embodiment. Like FIG. 7, this example shows a WiMAX downlink/uplink ratio of 30:17 utilizing power save mode 2, which listens to downlink activity for two subframes 811, 813, transmits uplink data during the second subframe 813, and sleeps for two subframes 815, 817. This four WiMAX subframe pattern repeats in subframes 821, 823, 825, 827. FIG. 8 also shows the individual WiMAX receiver signal 832 and WiMAX transmitter signal 834.

The WiMAX signal is pseudo-periodic in its steady state, and the patterns it follows can be determined through various methods for comparing the actual WiMAX signal with an expected pattern such as: signal transition analysis, Fast Fourier Transform analysis, delay-locked loop analysis, cross-correlation with an expected pattern, and covariance analysis as described in detail in U.S. patent application Ser. No. 11/680,067 entitled "Method and Apparatus for Co-Existence" filed on Feb. 28, 2007 by Russell, et al. and assigned to Motorola, Inc. After the periodic pattern is identified, it becomes possible to schedule (in the time domain) the Bluetooth packets and to alter the Bluetooth AFH map (in the frequency domain) to avoid collisions with the WiMAX traffic.

Note that in the example depicted in FIG. 8, ACL packets are used in the Bluetooth frames 851, 853, 855, 857, 859, 861, 863, 865, 867, 869, 871 so that the Bluetooth voice traffic can be variably scheduled. (This is contrast to SCO and eSCO traffic, which uses a fixed scheduling.) For comparison purposes, the payload of the ACL packets is assumed to be the same as that of the eSCO packets shown in FIG. 7. Note that, through rescheduling of the Bluetooth traffic (both the transmitter signal 882 and the receiver signal 884) in light of a time and frequency mask, no WiMAX or Bluetooth packet is lost. Consequently, no current is wasted performing Bluetooth transmissions (or retransmissions) which are deterministically going to be interfered with by WiMAX. This corresponds to a 36% drain current improvement compared to FIG. 7. In addition to current drain benefits, the coexistence apparatus 350 improves the quality of the audio as perceived by a user, because fewer Bluetooth packets are lost. Simulation results shows that a MOS of 4.0 or above can be maintained using ACL for Bluetooth voice traffic.

Although FIG. 8 assumes that the entire Bluetooth band is not available due to WiMAX interference, this is not necessarily the case. In a WiBro Frequency Division Duplex (FDD) situation, WiMAX signals may only interfere with the lower channels in the Bluetooth band. Also, in an LTE FDD situation, LTE uplink signals may only interfere with the higher channels in the Bluetooth band (and LTE downlink signals may not interfere with Bluetooth at all). Adding the frequency dimension to the time dimension makes previously unavailable Bluetooth timeslots available for use at certain Bluetooth channels. For example, in FIG. 5, Bluetooth channels 10-14 and 16-79 are available during Bluetooth timeslots 17-24, which would not occur in a time-dimension-only mask. Conversely, Bluetooth timeslots 9-16 and 25-32 are available at Bluetooth channels 1-8, which would not occur in a frequency-dimension-only mask. Thus, due to the interactions with the Bluetooth scheduler and the Bluetooth AFH map, certain Bluetooth slots that previously were completely unavailable (per the scheduler 370) may be available at certain Bluetooth channels. Conversely, Bluetooth channels that previously were completely unavailable (per the AFH sequence generator 380) may be available for certain periods of time.

A type of frequency-dimension-only mask, a Bluetooth AFH map, reduces deterioration in system performance by detecting frequency channels being affected by interference and eliminating those frequencies from the AFH pattern. AFH also helps the Bluetooth device in being a "good neighbor" by seeking to prevent the Bluetooth device from interfering with other radios operating in the same frequency band. An AFH pattern is set using an LMP_SET_AFH command by a Bluetooth master. The SET_AFH map includes a channel map and an AFH switch instant. The AFH switch instant tells the Bluetooth slave the time instant when the master will switch to a new hopping sequence. The master can update the channel map any time upon detecting new interference by providing a new LMP_SET_AFH command.

A majority of the interference encountered in real-life situations has a time domain duty cycle associated with it. Because AFH does not utilize time domain information, it is possible that some of the frequency channels being marked as "bad" in an AFH map do not have interference present at all times (or even a majority of the time). Given that the number of devices using the 2.4 GHz frequency band is increasing, adjusting Bluetooth AFH using a time and frequency mask 500 to take into account time domain information should increase throughput while still reducing interference.

Thus, in certain situations, a collocated radio might not mask out all of the available channels for Bluetooth transmission and reception, but only a portion of the ISM band. This is possible in an FDD use case, and the time and frequency mask can indicate only a portion of the band is usable during time-specific collocated transmissions from the wireless wide area network. The data transmission use case uses a time and frequency mask 500 to reschedule lower priority (e.g., Bluetooth) data transmissions and receptions around collocated higher priority (e.g., WiMAX) transmissions and receptions. By using Bluetooth ACL and rescheduling in light of a time and frequency mask 500, Bluetooth data throughput can be increased and current drain decreased.

In addition to reducing interference during traffic transmissions through use of a series of adjusted AFH maps, a time and frequency mask can be used during passive scanning. Currently implementations of AFH use received signal strength indication (RSSI) measurements and Packet Error Rate (PER) statistics to identify interference and remove affected channels from the AFH map. Based on the time and frequency mask 500, the Bluetooth transceiver can avoid scanning particular channels during the time periods that those channels are masked. In other words, RSSI scans can be scheduled (or skipped) so that they do not collide with other wireless technologies.

Figure 9:
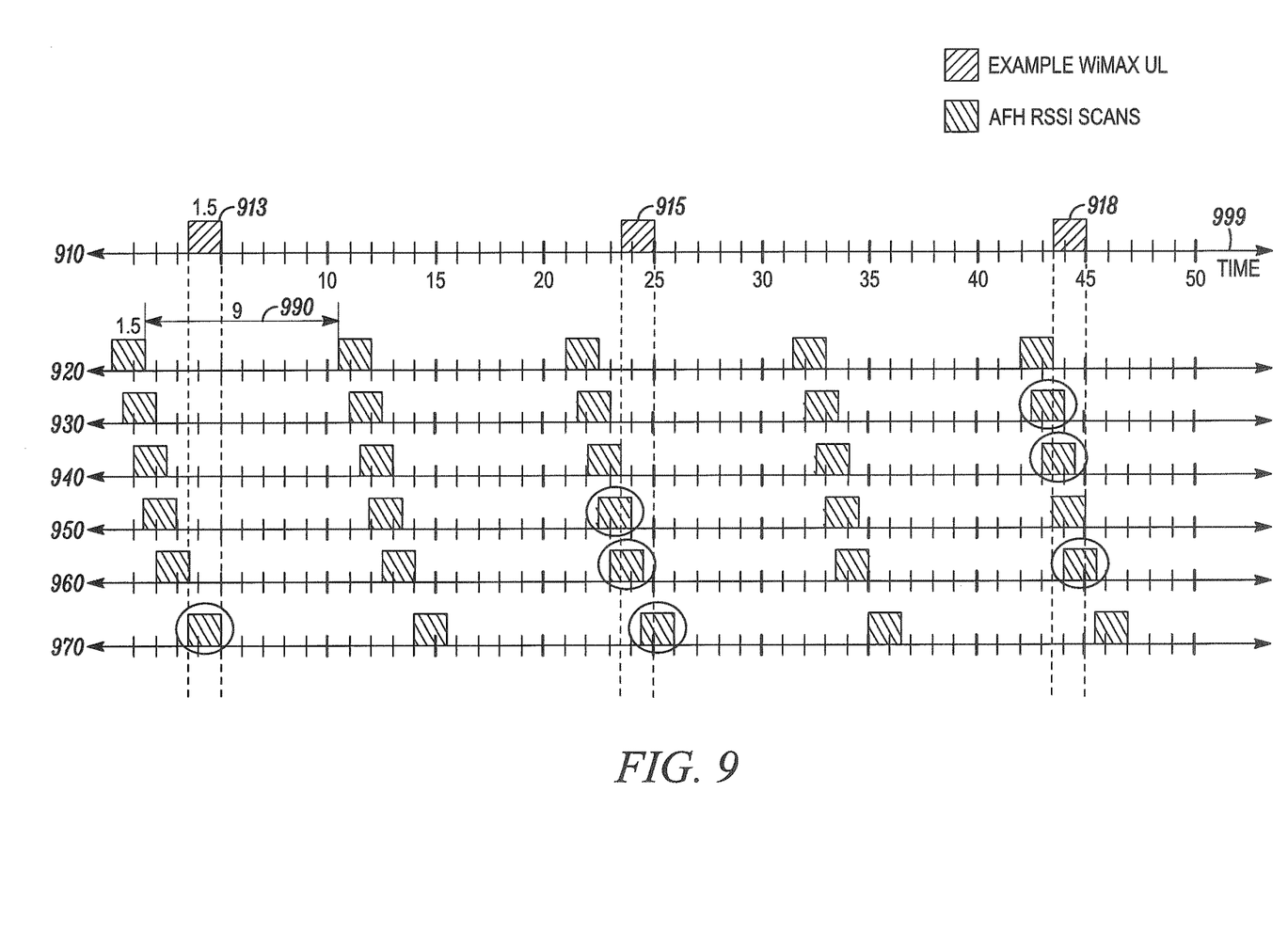
FIG. 9 is an example timing diagram showing coexistence of a WiMAX Voice over Internet Protocol (VoIP) data transmission with Bluetooth adaptive frequency hopping (AFH) scanning in accordance with an embodiment.

FIG. 9 is an example timing diagram showing the effect of scheduling RSSI scans to avoid WiMAX Voice over Internet Protocol (VoIP) uplink traffic 910 in accordance with an embodiment. The WiMAX traffic pattern shown here assumes the same power save mode 2 pattern as FIGS. 7-8 and thus the WiMAX uplink traffic signal 910 is very similar to the WiMAX transmitter signals 734, 834 shown in FIGS. 7 and 8.

The x-axis 999 is time, and the first WiMAX uplink traffic burst 913 occurs between 3.5 msec and 5.0 msec. The second WiMAX uplink traffic burst 915 occurs between 23.5 msec and 25.0 msec. The third WiMAX uplink traffic burst 918 occurs between 43.5 msec and 45.0 msec. These WiMAX uplink traffic bursts are periodic and limited to a particular frequency range. Using the methods and apparatus previously described with reference to FIGS. 3-6 and 9, the time and frequency mask 500 will mask out the corresponding Bluetooth channels for the periodic (every 20 msec) pulse having a duration of approximately 1.5 msec. Note that depending on the wireless circumstances, the time and frequency mask may also mask out other potential interference. In this example, however, the only potential interference is a collocated WiMAX transmission.

In this implementation, a time interval 990 between successive RSSI scans is set to 9 msec, and the duration of each RSSI scan is approximately 1.5 msec. According to various Bluetooth component implementations, the time interval can be varied, but this in case it is set to detect interference quickly. In other situations, the time interval 990 can be set to another value or varied between individual scans. In total, the Bluetooth radio needs to perform about fifteen RSSI scans to gather enough statistics to create an AFH map.

Row 920 shows the timing of five RSSI scans. In this particular implementation, the time and frequency mask 500 does not block any of these five individual RSSI scans. As row 920 continues, however, three RSSI scans would be blocked by the time and frequency mask by the time fifteen RSSI scans were completed. The three blocked RSSI scans would be replaced by three additional RSSI scans after the first fifteen scheduled scans. By blocking the three RSSI scans that would normally encounter interference with WiMAX, the scans (eighteen scheduled with three blocked, resulting in a total of fifteen scans) could be completed with 0% interference by the WiMAX uplink traffic signal 910.

Rows 920, 930, 940, 950, 960, 970 show various alternate timings of five RSSI scans, and circles indicate scans that would be blocked by the time and frequency mask. For row 930, 940, the periodic WiMAX uplink traffic signal 918 would be predicted by the time and frequency mask to interfere with the fifth RSSI scan which is consequently blocked. For row 950, the third RSSI scan is blocked by the time and frequency mask. In row 960, the third and fifth RSSI scans are blocked by the time and frequency mask. And for row 970, the first and third RSSI scans are blocked by the time and frequency mask.

Use of the time and frequency mask reduces the potential collisions between the WiMAX uplink signal and the RSSI scans. Such collisions would create faulty frequency channel data which in turn further increases the time taken to detect interference and create an AFH map. Thus, although later RSSI scans are performed as substitutes for the blocked RSSI scans, the substitute scans would probably occur even without the time and frequency mask, and the increased time would not be due to slower convergence caused by faulty scan results.

By adjusting the time interval 990 between AFH RSSI scans and the timing of the AFH RSSI scans in view of a time and frequency mask, the current drain due to AFH RSSI scans can be reduced in the presence of interfering wireless signals from either collocated or non-collocated radios.

Thus, the method and apparatus for multi-radio coexistence can reduce interference among radios operating in overlapping or adjacent frequency bands. These radios may be collocated or non-collocated. A time and frequency mask can be used to adjust an AFH map to reduce interference during transmission and also can be used to adjust scanning timing and scanning time intervals to reduce collisions when creating an AFH map.

While this disclosure includes what are considered presently to be the embodiments and best modes of the invention described in a manner that establishes possession thereof by the inventors and that enables those of ordinary skill in the art to make and use the invention, it will be understood and appreciated that there are many equivalents to the embodiments disclosed herein and that modifications and variations may be made without departing from the scope and spirit of the invention, which are to be limited not by the embodiments but by the appended claims, including any amendments made during the pendency of this application and all equivalents of those claims as issued.

It is further understood that the use of relational terms such as first and second, top and bottom, and the like, if any, are used solely to distinguish one from another entity, item, or action without necessarily requiring or implying any actual such relationship or order between such entities, items or actions. Much of the inventive functionality and many of the inventive principles are best implemented with or in software programs or instructions. It is expected that one of ordinary skill, notwithstanding possibly significant effort and many design choices motivated by, for example, available time, current technology, and economic considerations, when guided by the concepts and principles disclosed herein will be readily capable of generating such software instructions and programs with minimal experimentation. Therefore, further discussion of such software, if any, will be limited in the interest of brevity and minimization of any risk of obscuring the principles and concepts according to the present invention.

As understood by those in the art, a mobile device includes a processor that executes computer program code to implement the methods described herein. Embodiments include computer program code containing instructions embodied in tangible media, such as floppy diskettes, CD-ROMs, hard drives, or any other computer-readable storage medium, wherein, when the computer program code is loaded into and executed by a processor, the processor becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The invention claimed is:

1. A method for multi-radio coexistence comprising:
   receiving historical frequency usage information from a first radio;
   receiving historical time usage information from the first radio;
   creating a time and frequency mask by extrapolating the historical frequency usage information and the historical time usage information to future times and future frequencies when the first radio will be active; and
   using the time and frequency mask to schedule a second radio and one or more other radios to avoid receiving when the first radio will be active, the second radio being a master radio and the one or more other radios being slaves of the second radio.

2. The method according to claim 1 further comprising:
   using the time and frequency mask to schedule the second radio to avoid transmitting when the first radio will be active.

3. The method according to claim 1 wherein the first radio is collocated with the second radio.

4. The method according to claim 3 wherein the receiving historical frequency usage information from a first radio comprises:
   receiving instantaneous frequency usage information.

5. The method according to claim 3 wherein the receiving historical time usage information from a first radio comprises:
   receiving media access control level (MAC)-level timing information.

6. The method according to claim 3 wherein the receiving historical time usage information from a first radio comprises:
   receiving hardware interface information.

7. The method according to claim 3 further comprising:
   receiving historical frequency usage information from a third radio, wherein the third radio is non-collocated with the second radio.

8. The method according to claim 1 wherein the first radio is non-collocated with the second radio.

9. The method according to claim 8 wherein the receiving historical frequency usage information from a first radio comprises:
   receiving over-the-air frequency usage information from the first radio.

10. The method according to claim 8 wherein the receiving historical frequency usage information from a first radio comprises:
using carrier sensing to obtain the historical frequency usage information from the first radio.

11. The method according to claim 1 further wherein using the time and frequency mask comprises:
adjusting timing scheduler of the second radio.

12. The method according to claim 1 further wherein using the time and frequency mask comprises:
adjusting an adaptive frequency hopping pattern of the second radio.

13. The method according to claim 12 further comprising:
transmitting the adjusted adaptive frequency hopping pattern to a compatible non-collocated radio.

14. The method according to claim 13 wherein the compatible non-collocated radio is a Bluetooth radio.

15. The method according to claim 12 wherein the first radio is a non-Bluetooth radio and the second radio is a Bluetooth radio.

16. The method according to claim 15 further comprising:
scheduling Bluetooth radio transmissions using the adjusted adaptive frequency hopping pattern.

17. The method according to claim 16 further comprising:
scheduling passive scans using the adjusted adaptive frequency hopping pattern.

18. The method according to claim 1 further comprising:
receiving additional frequency usage information from the first radio;
receiving additional time usage information from the first radio;
updating the time and frequency mask by extrapolating the historical frequency usage information, the additional frequency usage information, the historical time usage information, and the additional time usage information to future times and frequencies when the first radio will be active; and
using the updated time and frequency mask to schedule the second radio to avoid receiving when the first radio will be active.

19. A multi-radio coexistence apparatus comprising:
a collocated radio input for receiving timing usage information from a collocated radio;
a non-collocated radio input for receiving frequency usage information from a non-collocated radio;
a time and frequency mask generator, coupled to the collocated radio input and the non-collocated radio input, for creating a time and frequency mask using the timing usage information and the frequency usage information,
the multi-radio coexistence apparatus being operable to send the time and frequency mask to at least one of the collocated radio or the non-collocated radio and to one or more other radios, at least one of the collocated radio or the non-collocated radio being a master radio, the one or more other radios being slaves to the master radio, and the time and frequency mask being sent to the one or more other radios through the master radio.

20. The multi-radio coexistence apparatus according to claim 19 wherein the time and frequency mask generator comprises:
a time and frequency usage predictor, coupled to the collocated radio input and the non-collocated radio input, for extrapolating future times and future frequencies when the collocated radio or the non-collocated radio will be active.

* * * * *